United States Patent
Khanna et al.

[11] Patent Number: 5,842,180
[45] Date of Patent: Nov. 24, 1998

[54] METHOD AND SYSTEM FOR DETECTING AND CORRECTING ERRORS IN A SPREADSHEET FORMULA

[75] Inventors: Karan Khanna, Clyde Hill; Edward A. Martinez, Redmond, both of Wash.

[73] Assignee: Microsoft Corporation, Redmond, Wash.

[21] Appl. No.: 625,535

[22] Filed: Mar. 28, 1996

[51] Int. Cl.⁶ .................................................. G06F 5/00
[52] U.S. Cl. .......................................... 705/30; 707/504
[58] Field of Search ........................ 705/30, 33; 707/503, 707/504, 507, 508, 533, 538–540, 903, 905

[56] References Cited

U.S. PATENT DOCUMENTS

| | | | |
|---|---|---|---|
| 5,280,575 | 1/1994 | Young et al. | 707/504 |
| 5,471,612 | 11/1995 | Schlafly | 395/700 |
| 5,603,021 | 2/1997 | Spencer | 345/604 |
| 5,633,998 | 5/1997 | Schlafly | 395/180 |
| 5,655,136 | 8/1997 | Morgan | 382/182 |

*Primary Examiner*—Frantzy Poinvil
*Attorney, Agent, or Firm*—Jones & Askew, LLP

[57] ABSTRACT

In association with a computer system, a method and system for detecting and correcting errors in a spreadsheet formula. A token is created corresponding to each entry in the formula. As the formula is constructed, each token is added to the top of a formula token stack. When the formula is completed, a parser parses the formula token stack starting at the bottom of the stack and parsing each subsequent token. By examining the tokens in the formula token stack and their relationship to other tokens, the system determines whether an error exists in the formula. If an error is found to exist in the formula, an error class code is assigned to the error corresponding to the type of error. An error corrector rule corresponding to the error class code is applied and identifies a correction for the error. After a correction for the error is identified, the remainder of the formula token stack is parsed to detect and correct any other errors. When the entire formula token stack has been parsed and all detected errors have been corrected, a dialog box is displayed containing the completely corrected formula.

24 Claims, 12 Drawing Sheets

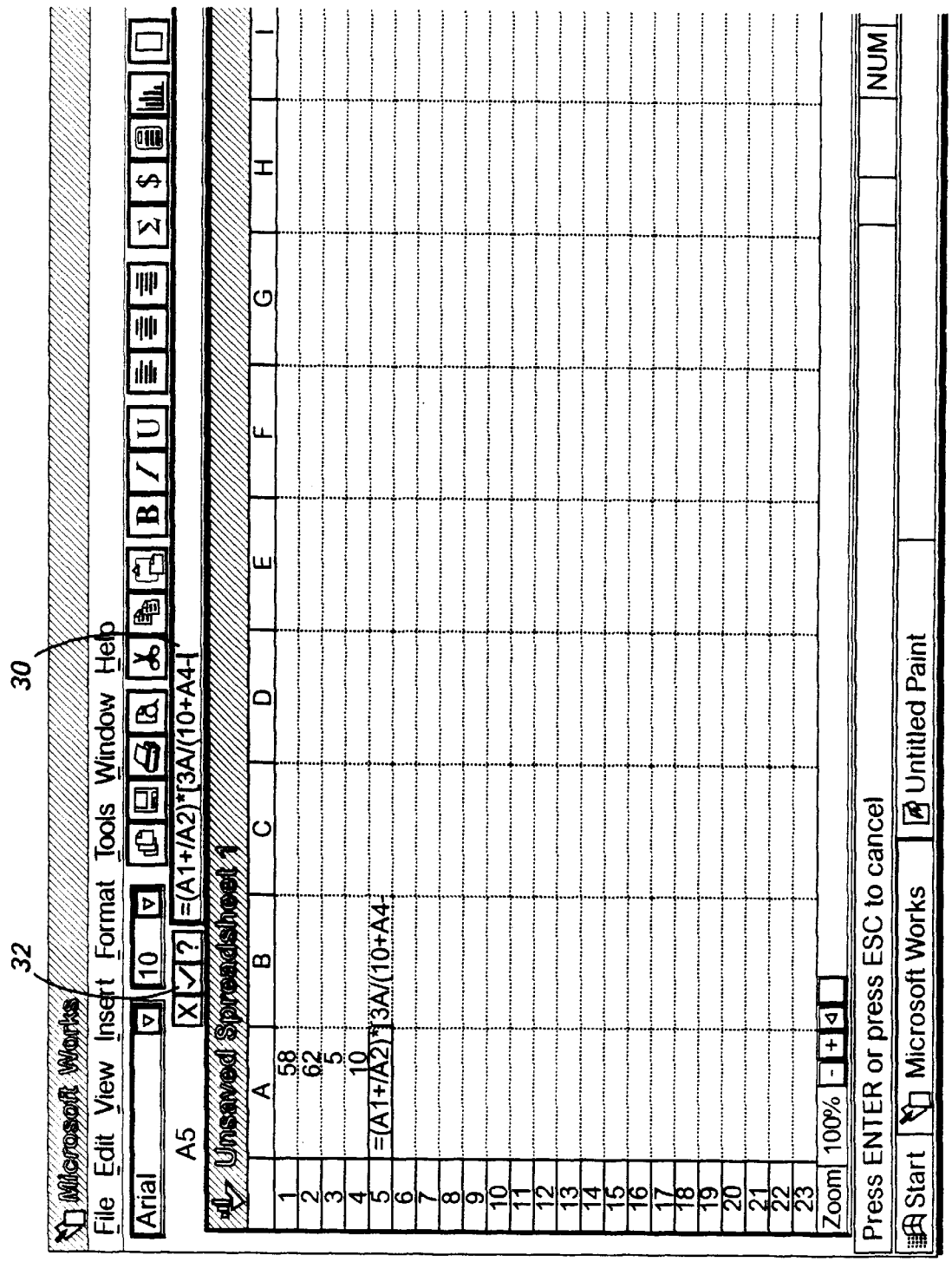

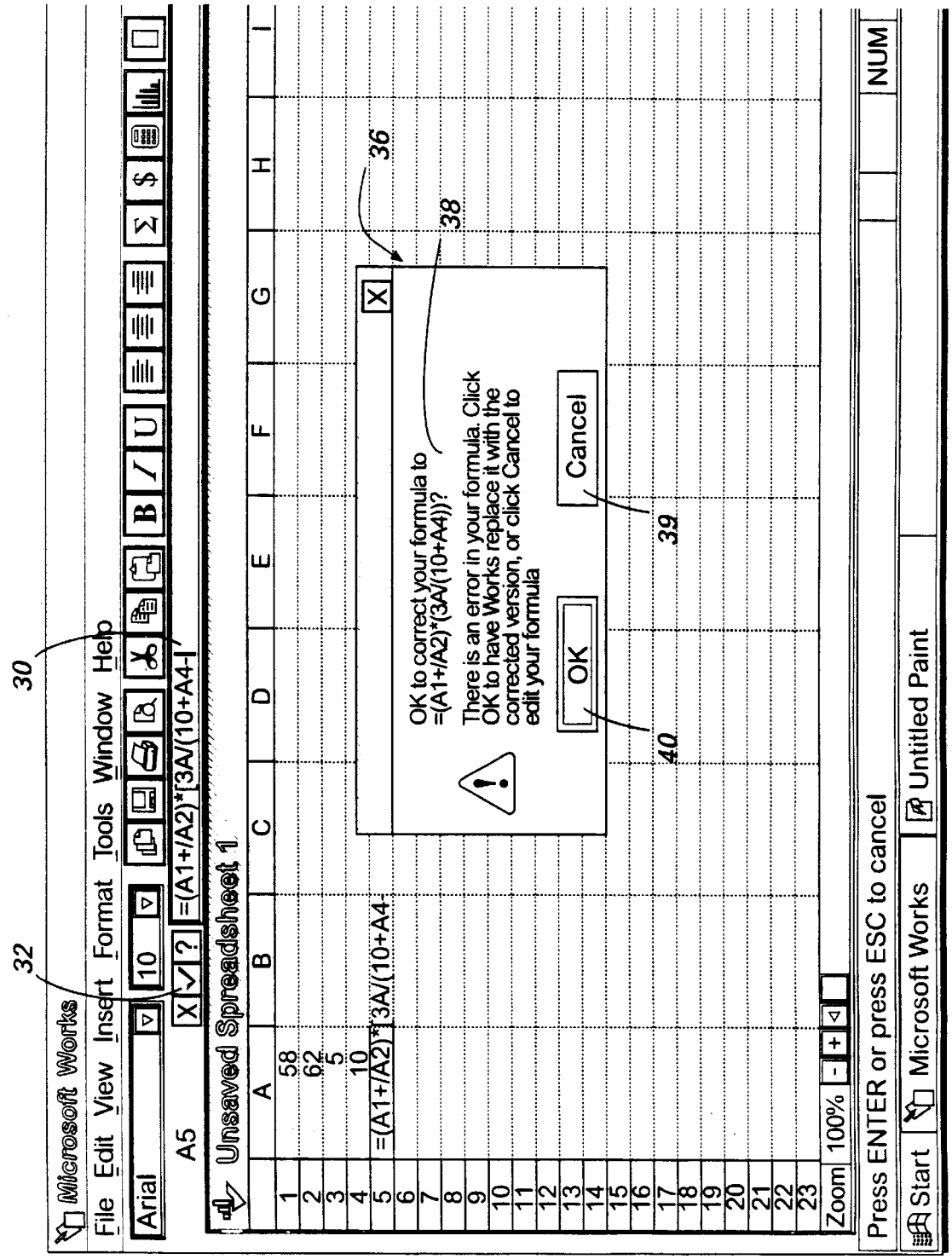

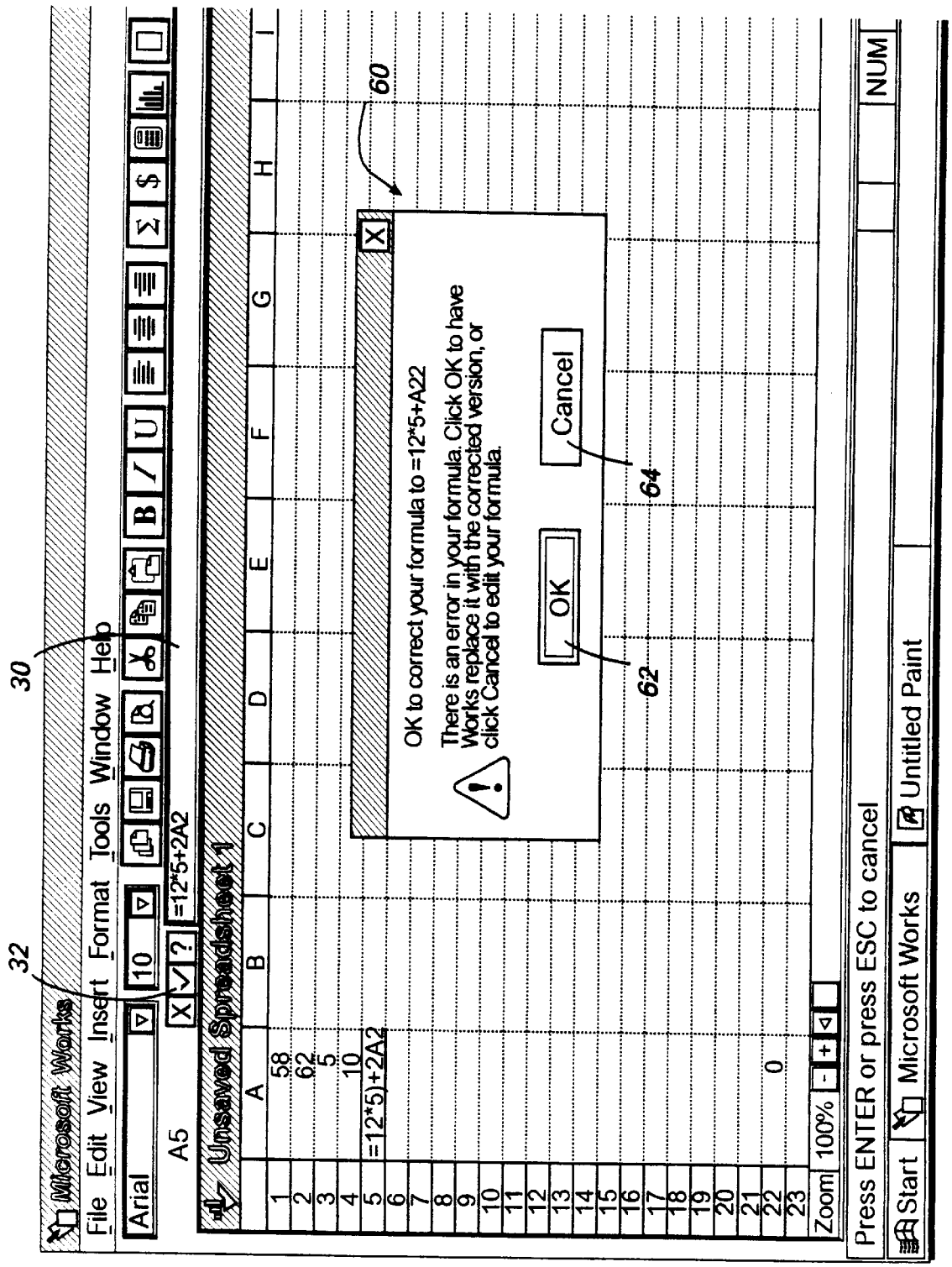

METHOD AND SYSTEM FOR DETECTING AND CORRECTING ERRORS IN A SPREADSHEET FORMULA

TECHNICAL FIELD

The present invention relates generally to the entry of a formula in a cell of a spreadsheet and, more specifically, to a method and system for detecting and correcting errors in a spreadsheet formula.

BACKGROUND OF THE INVENTION

Spreadsheet programs are widely-used application programs that run on personal computers. Spreadsheet programs are commonly used for budgets, forecasting, and other finance-related tasks. In a spreadsheet program, data and formulas are entered in ledger-like forms for analysis, tracking, planning, or evaluations of the impacts of real or proposed changes on data.

Spreadsheet programs use rows and columns of cells for the display of data. Depending on the program, a single spreadsheet can contain anywhere from thousands to millions of cells. Some spreadsheet programs can also link one spreadsheet to another spreadsheet that contains related information and can update data in linked spreadsheets automatically. Spreadsheet programs may also include macro facilities, and some can be used for creating and sorting databases. For printed output, spreadsheet programs usually provide graphing capabilities and a variety of formatting options for printed pages and text, numeric values, and captions and legends in graphs.

Each row and column in a spreadsheet is unique, so each cell is uniquely identified. Typically, each column is identified by a letter, and each row is identified by a number. Thus, the cell located at the intersection of column A and row 1 is identified as cell A1. Each cell is displayed as a rectangular space that can hold text, numerical data, or a formula that uses parameters, which may comprise data in other cells, to calculate a desired result. To ease computation, spreadsheet programs include built-in functions that perform standard calculations.

Such built-in functions may include simple arithmetic functions such as addition (designated by the + character), subtraction (designated by the − character), and multiplication (designated by the * character). Many other functions may be provided in the spreadsheet, including complex trigonometric functions to calculate the sine or cosine of a variable (designated by SIN and COS, respectively), and functions to find the natural logarithm and exponential value of a variable (designated by LN and EXP, respectively). Many other functions are provided by spreadsheet programs to perform a wide variety of calculations and data comparisons.

A formula may be constructed within a cell of the spreadsheet using one or more of the built-in functions combined with any other constants or variables. The proper syntax of each formula is entered into the spreadsheet directly by the user through the use of keystrokes on a keyboard. The various functions available in spreadsheet formulas are denoted by a particular character or characters. For example, the very simple formula A1+B1 may be entered in the spreadsheet when the user wants to add the numbers located in cells A1 and B1. More complicated formulas utilizing unfamiliar and complex functions require the user to manually enter a function identifier, such as SIN, COS, etc., in order to use the function. Therefore, the user must memorize the syntax required to correctly enter the formula. Formula entry can quickly become very difficult for the user, and the probability of improperly entering such formulas is high.

Spreadsheet programs are popular among both sophisticated, expert computer users as well as ordinary, novice users. Ordinary users may include homeowners who use spreadsheet programs for maintaining household budgets and personal finances. Other ordinary users may include small business owners who use spreadsheets to perform tasks such as tracking inventory, costs, sales, etc. Frequently, these tasks require the use of complicated formulas in the spreadsheet program.

These ordinary users of computers are usually not well-versed in mathematics or computer syntax related to the formulas that can be entered in the spreadsheet. Therefore, the user may not remember the proper syntax and function identifiers required for various functions and therefore may incorrectly enter the formula or may be forced to consult a lengthy and complicated user's manual to obtain the correct syntax.

Current spreadsheet programs require that the user be familiar with the complicated syntax needed to enter formulas in the spreadsheet. Thus, when the user wishes to enter a formula in the spreadsheet, the user must manually enter the formula including all proper syntax using the keyboard without being aided or prompted by the spreadsheet program.

When a user manually enters a formula, the probability of errors in the formula are high. Common errors include improperly referencing other cells that are part of the calculation, transposing cell addresses (identifying cell A1 as cell 1A), placing multiple operators together, and mismatching parentheses. Also, incorrect spacing as well as various other typographical errors can result in an improperly entered formula.

Current spreadsheet programs utilize a "function wizard". The wizard assists the user with the entry of parameters into an individual function but does not allow the user to enter functions into the formula. Thus, the function wizard, while assisting the user with certain aspects of formula construction, only assists the user after the proper syntax for a function has been manually entered. Consequently, function wizards associated with current spreadsheet programs do not free the user from the difficult task of remembering and entering the proper formula syntax. Thus, function wizards do not assist the user in the construction of a formula in its entirety.

Also, current function wizards do not perform error correction. Although current spreadsheet programs are able to detect an improperly entered formula and generate and display a message to the user, current programs do not detect the precise error that is present within the formula and also do not provide a suggestion for the correction of the error. If the user incorrectly enters a formula, current spreadsheet programs generate a generic error message to the user indicating that the formula has been incorrectly entered. However, the generic error message does not notify the user of the type or location of the error. Therefore, without knowing what type of error is present in the formula, a user is left with the tedious and frustrating task of poring through a lengthy and complicated formula to detect where the error exists and editing the formula to correct the error. This increases user frustration and decreases efficiency.

All of these problems associated with formula entry serve not only to make the use of formulas in spreadsheets time-consuming and inefficient but also frustrating for the user. These problems may force a frustrated user to simply give up and cease entering formulas in spreadsheet programs. By not efficiently and effectively utilizing all of the benefits that spreadsheet formulas provide, the user does not maximize the capabilities of the spreadsheet program.

SUMMARY OF THE INVENTION

The present invention provides a method and system for detecting and correcting errors that a user makes when constructing a spreadsheet formula. When the user constructs a formula in a spreadsheet, the present invention creates a token corresponding to each entry in the formula. As the user constructs the formula, each token is added to the top of a formula token stack.

When the user has completed construction of the formula, a parser parses the formula token stack starting at the bottom of the stack and parsing each subsequent token. By examining the tokens in the formula token stack and their relationship to other tokens, the present invention determines whether an error exists in the formula.

The present invention maintains a list of types of common errors that exist in spreadsheet formulas. If an error is found to exist in the formula, the present invention determines the type of error and assigns an error class code to the error corresponding to the type of error.

Based on the error class code assigned to the error, the present invention determines whether a correction to the error can be identified. The invention maintains an error corrector rule for each error class code identifying the common types of errors. The invention applies the appropriate error corrector rule based on the error class code assigned to the error. The error correction rule identifies a correction for the error.

After a correction for the error is identified, the remainder of the formula token stack is parsed to detect and correct any other errors. When the entire formula token stack has been parsed and all detected errors have been corrected, a dialog box is displayed containing the completely corrected formula. The user may select buttons in the dialog box to enter the corrected formula in the spreadsheet or manually edit the incorrect formula. If no suggested correction is identified for the error, a dialog box is displayed prompting the user to return to the formula, where the present invention highlights the error so that the error can be more easily identified and corrected by the user.

If the error in the formula is found not to be one of the type of errors included in the list of common errors, the present invention does not attempt to identify a correction and displays a dialog box on the display screen prompting the user to manually edit the formula.

BRIEF DESCRIPTION OF THE DRAWINGS

FIGS. 2A–C are examples of display screens displayed in accordance with the present invention when all errors in the formula are correctable.

FIGS. 3A–F are examples of display screens displayed in accordance with the present invention when all errors in the formula are not correctable.

DETAILED DESCRIPTION

Figure 1:
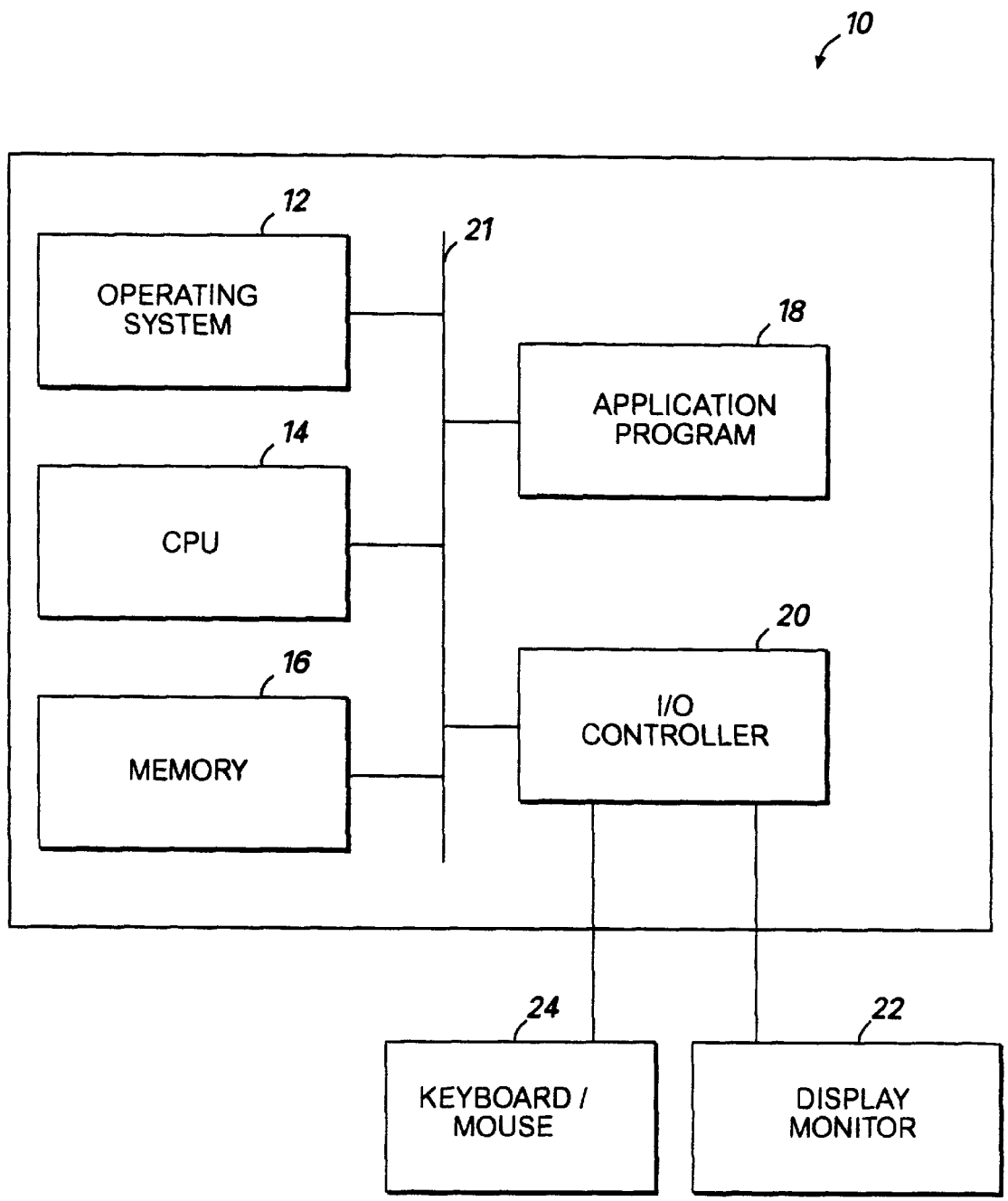
FIG. 1 is a block diagram of a computer system on which the present invention is implemented.

Turning next to the figures, the preferred embodiment will now be described in detail. The present invention is directed to a method and system for detecting and correcting errors in a spreadsheet formula. Although the preferred embodiment of the present invention will be described with respect to spreadsheet programs, those skilled in the art will recognize that the present invention may be utilized in connection with other software programs in which mathematical or other types of formulas are entered.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Furthermore, it should be understood that there is a distinction between the methods, steps, or operations completed by a computer and the method of computation itself. The present invention does not involve a method of computation. Instead, the present invention relates to methods, processes, steps, or operations for a computer and the processing of electrical or other physical signals to generate desired physical signals and to display results and interactions.

Turning now to the drawings, in which like numerals indicate like elements throughout the several figures, FIG. 1 illustrates a computer system on which the preferred embodiment of the present invention is implemented. Referring to FIG. 1, the computer system is generally shown at 10. The computer system includes an operating system 12, a central processing unit (CPU) 14, a memory storage device 16, an application program or program module 18, and an input/output (I/O) controller 20. The above referenced components are operatively connected by a system bus 21. Connected to the computer is a display 22, preferably a video monitor, for displaying images to a user, and an input means 24, preferably a keyboard and mouse, for allowing a user to input data into the computer system. The application program or program module 18 includes a spreadsheet program that permits the user to enter formulas into a cell or cells of a spreadsheet.

The present invention comprises programming within the application program that detects and corrects errors that are created when a user constructs a formula within a spreadsheet. Typically, a user enters a formula into a cell in the spreadsheet using the standard method of entering the required syntax using a keyboard. Alternatively, the user may enter the formula using the method described in co-pending U.S. patent application Ser. No. 08/558,820 entitled "METHOD AND SYSTEM FOR CONSTRUCTING A FORMULA IN A SPREADSHEET", now pending assigned to Microsoft Corporation, Redmond, Wash., also the assignee of the present invention. The method and system of the present invention will be described herein with reference to the standard method of formula entry, however, it should be understood that the error detection and correction features of the present invention may be utilized regardless of the manner in which the user enters the formula into the spreadsheet.

When the user is running the spreadsheet program on the computer system, a spreadsheet such as that shown in FIG. 2A is displayed on the display 22. The spreadsheet includes a plurality of individual cells, in columns identified from left to right in alphabetical order and rows identified from top to bottom in numerical order. Near the top of the display is a formula bar 30.

The user may enter data into the current cell in the spreadsheet. Such data may include text, numbers, or formulas. The current cell in the spreadsheet is identified by a thickened border around the periphery of the cell. In FIG. 2A, the current cell is identified as cell A5. Each of cells A1, A2, A3, and A4 contain numerical data.

An example of a formula that a user may enter in the current cell is shown in FIG. 2A. When a formula is entered in the current cell, the characters entered by the user are displayed both within the current cell and within the formula bar 30. It should be understood that, for the examples described herein, all formulas entered in a cell of a spreadsheet are preceded by the character "=". However, the present invention is in no way limited only to formulas that require this leading character and the following description of spreadsheet formulas will make no further reference to the leading "=" character.

In cell A5, the user has entered a formula utilizing multiple functions, multiple cell references, and parentheses to group particular data together. However, the formula entered in cell A5 contains several errors. The correct formula should be entered as (A1+A2)*(A3/(10+A4)). However, the spreadsheet of FIG. 2A shows that the user has entered the error-filled formula (A1+/A2)*[3A/10+A4−. Therefore, the user has made five errors when entering the formula. The errors are: multiple operators, i.e., operator "/" follows operator "+", a bracket "[" instead of an open parentheses "(", the bracket character that should be an open parentheses is unmatched, a transposed character reference, i.e. "3A" instead of "A3", and an extra trailing operator "−".

When the user has completed entering the formula, the check box 32 is selected. If the formula is entered correctly, the present invention enters the formula and displays the result of the formula in the current cell. However, if the formula contains an error, the present invention detects the error and displays a dialog box to prompt the user to correct the error. It should be understood that the method of the present invention can be accessed by any suitable means consistent with the graphical user interface associated with the computer system on which it is implemented. Therefore, the present invention should not be construed to be limited only to use with the graphical user interface elements described herein.

Figure 2C:
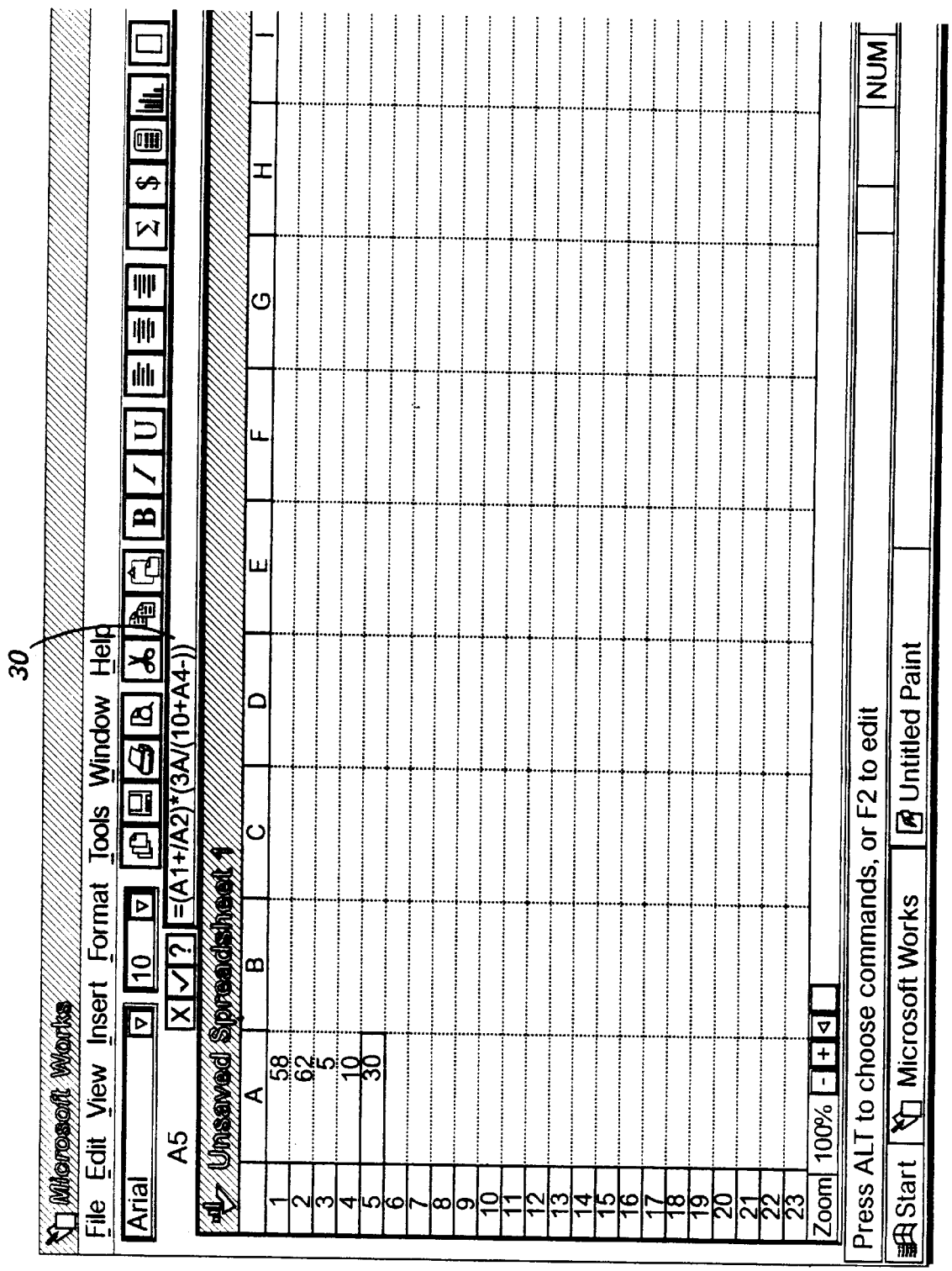

Because the formula entered in cell A5 in FIG. 2A contains errors, the dialog box 36, as seen in FIG. 2B, is displayed. The dialog box 36 displays the completely corrected formula 38 and also displays a textual message that directs the user to either accept the corrected formula or manually edit the incorrect formula. If the corrected formula 38 is not acceptable, the user selects the Cancel button 39. When the Cancel button 39 is selected, the dialog box 36 is removed from the display and the user manually edits the formula in the cell. If the corrected formula 38 is acceptable to the user, the OK button 40 is selected. When the OK button is selected, the corrected formula is substituted for the incorrect formula in the current cell, as shown in FIG. 2C. When the correct formula is entered in the cell, the cell displays the result of the formula. As seen in FIG. 2C, the formula entered in cell A5, displayed in the formula bar 30, and the spreadsheet calculates a result for the formula. The resultant numerical value of the formula is displayed in current cell A5.

FIGS. 2A–C show the sequence of displays that are displayed when an error-filled formula is completely correctable by the method of the present invention. However, all errors in a formula may not be able to be corrected by the present invention. An example of such a formula is described with reference to FIGS. 3A–F.

Figure 3A:
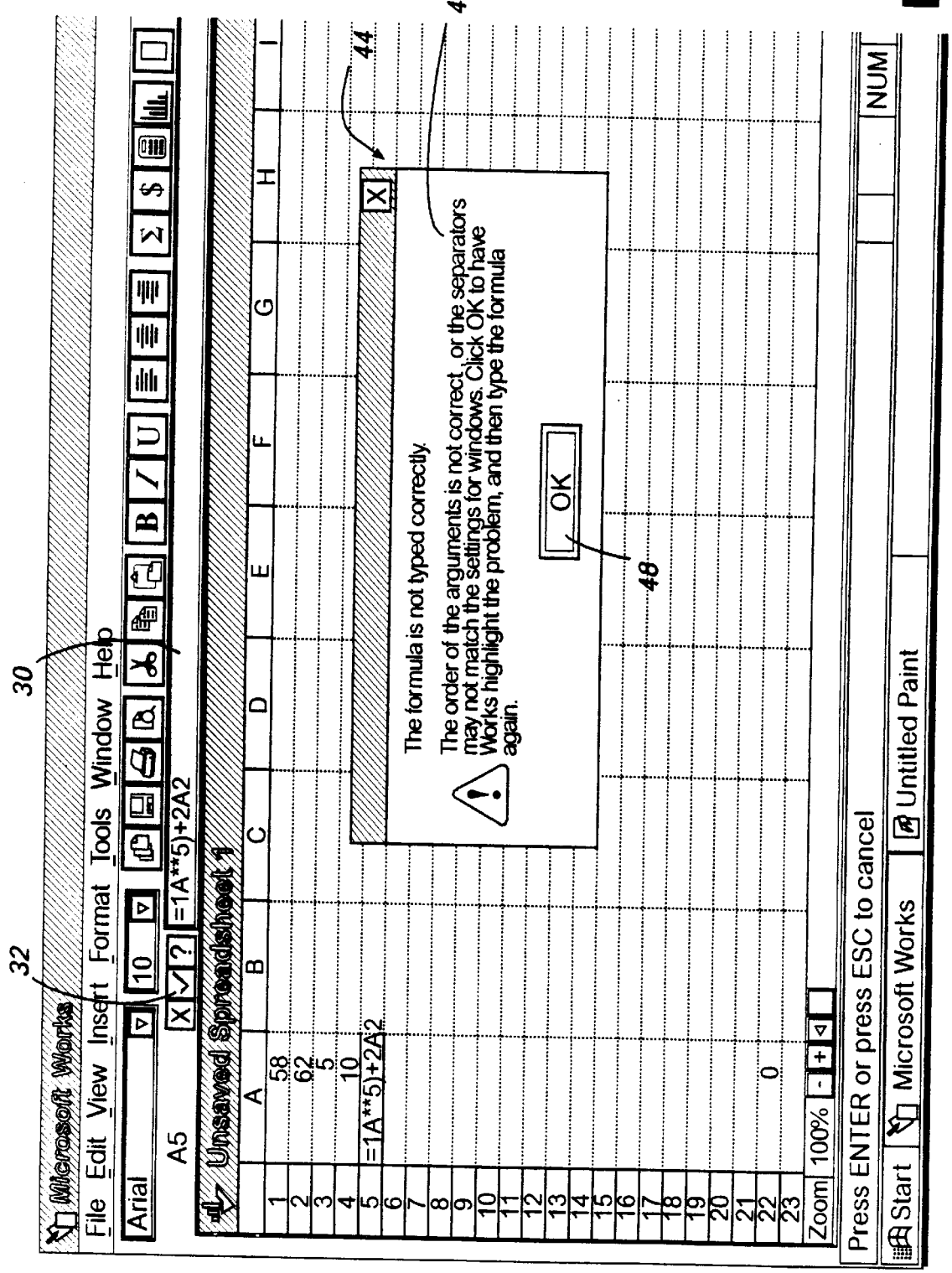

In FIG. 3A, the user has entered the formula 1A**5)+ 2A2. The correct formula should be 12*5+A22. When the user enters the formula and selects the check box 32, the dialog box 44 is displayed. The dialog box 44 is displayed when the present invention detects an error or errors in the formula but cannot identify a completely corrected formula. The dialog box displays a textual message 46 that informs the user that an error exists in the formula. When the OK button 48 is selected, the dialog box is removed from the display screen and the formula is displayed in the current cell.

Figure 3B:
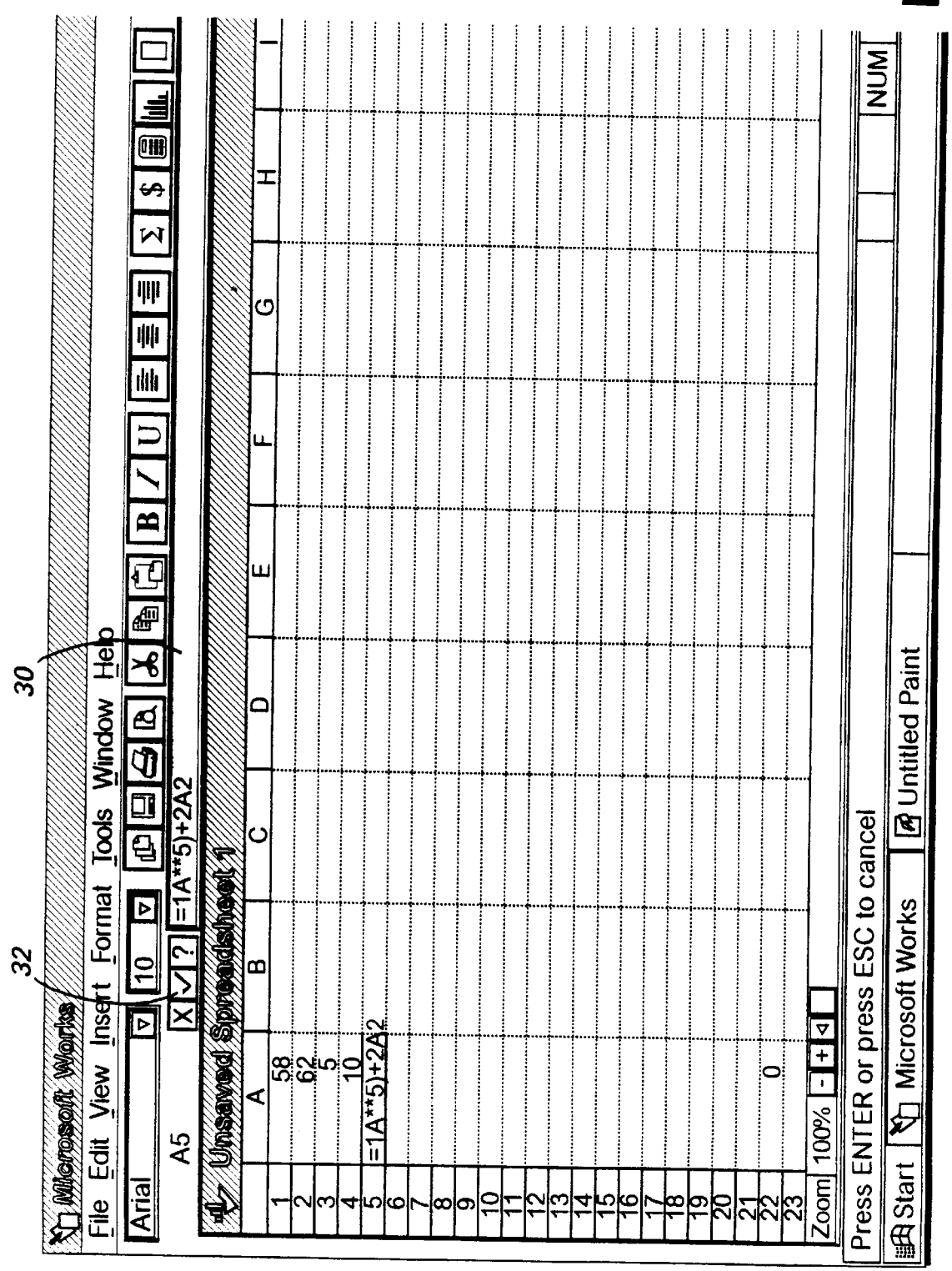

The first error in the formula, as detected from left to right, is highlighted to allow the user to take notice of the error. In the formula of FIG. 3B, the error that is highlighted is the character "A" that follows the character "1". This sequence of characters is identified by the present invention as being a cell reference that has been transposed. However, in the correct formula, the characters "1A" should be the number "12". Therefore, the user manually edits the formula by changing the characters "1A" to "12". The user may continue to manually edit the formula, or the user may select the check button 32.

Figure 3C:
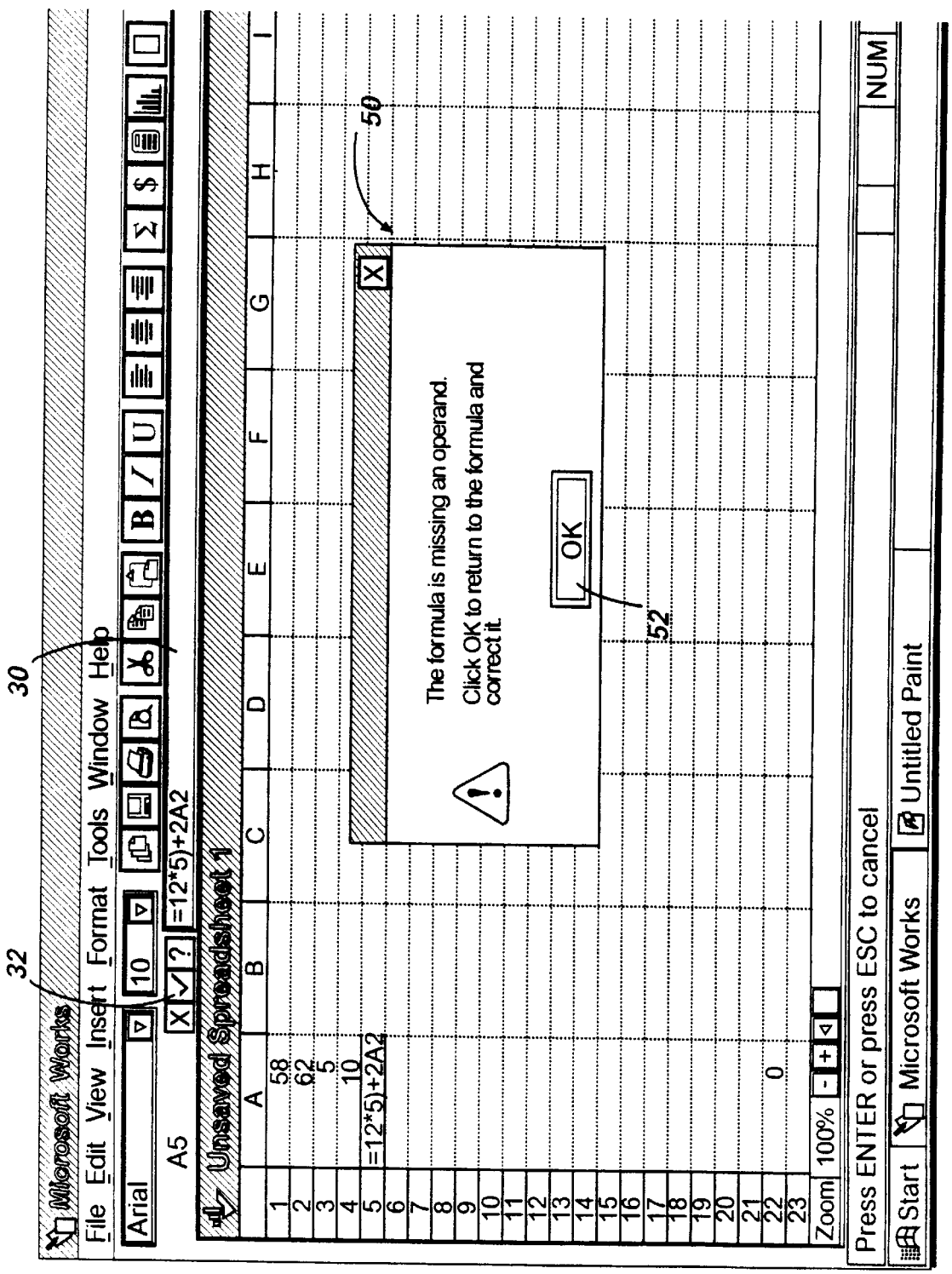

When the check button is selected, the present invention again determines whether errors exist in the formula. Because another error exists in the formula, the dialog box 50 is displayed, as shown in FIG. 3C. The dialog box 50 provides a textual message relating to the error and prompts the user to edit the formula by selecting the OK button 52. When the OK button is selected, the dialog box 50 is removed from the screen, and the error in the formula is highlighted in the current cell. The present invention highlights the second multiplication operator, "*". The user manually deletes the multiple operator and again selects the check box.

Figure 3D:
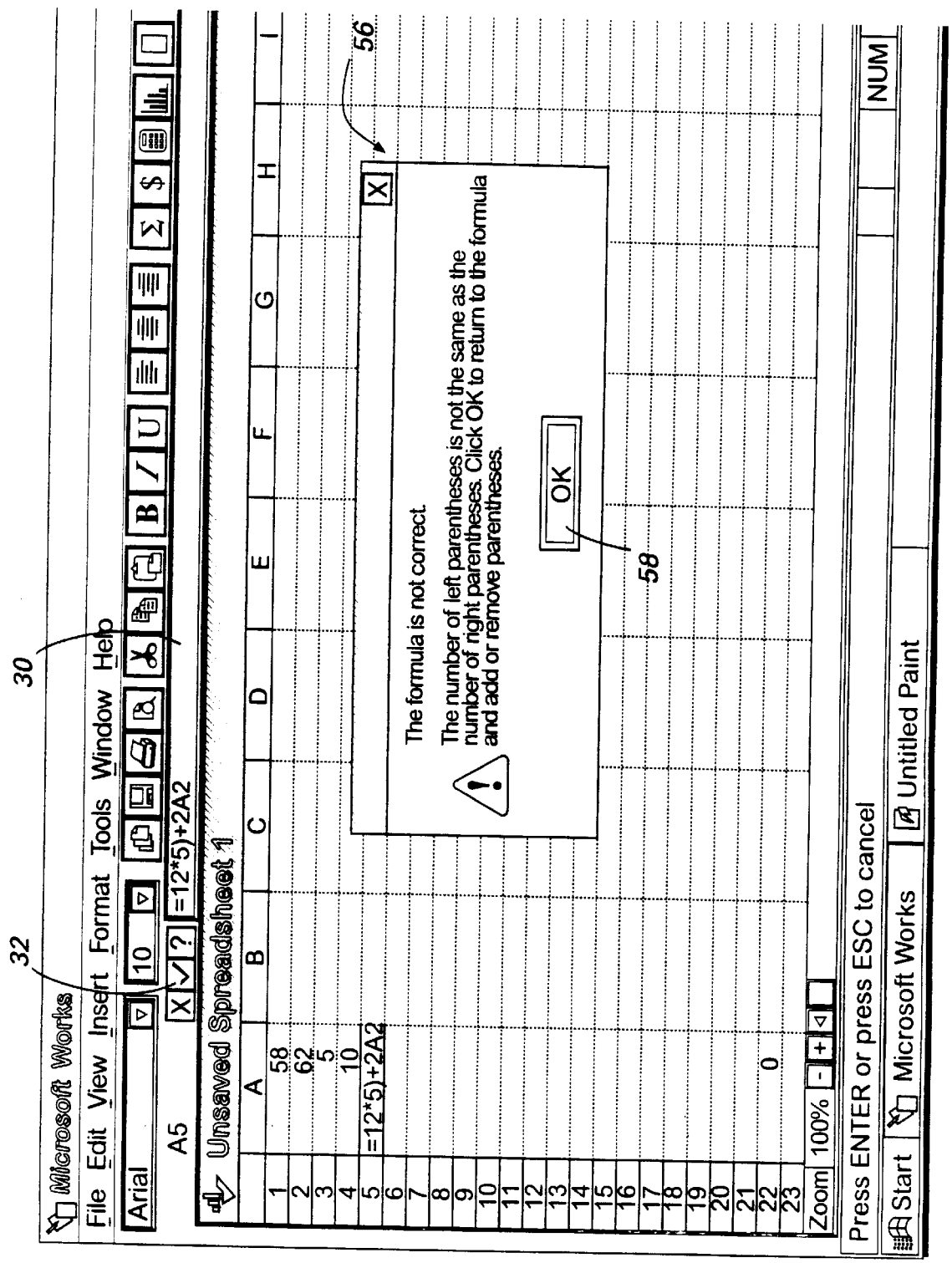

The present invention again determines whether another error exists in the formula. Because an improper parentheses character is included in the formula, a dialog box 56, as shown in FIG. 3D, is displayed that describes the error and prompts the user to select the OK button 58 to manually edit the formula. The user then selects the OK button and the dialog box is removed form the screen. The parentheses character is then highlighted in cell A5, thereby informing the user of the error. The user then deletes the parentheses and selects the check button.

Figure 3F:
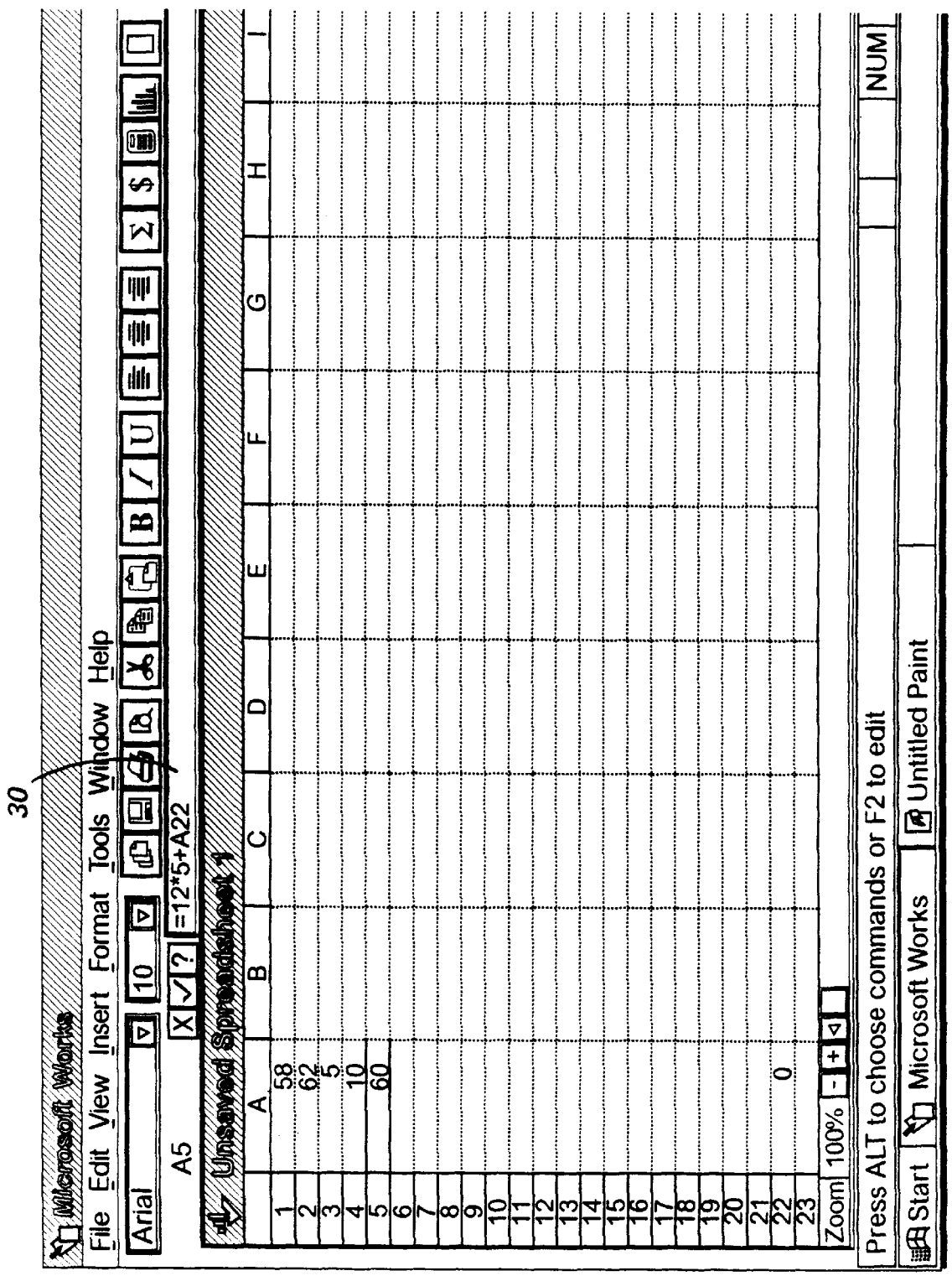

The present invention then examines the formula and determines that a final error exists. The invention determines that the character sequence "2A2" is a transposed cell reference that should be "A22". The invention displays the dialog box 60, shown in FIG. 3E, which displays the completely corrected formula and prompts the user to accept the corrected formula or reject the corrected formula. If the user selects the Cancel button 64, the user can again manually edit the formula displayed in cell A5. If the user selects the OK button 62, the invention replaces the incorrect formula in the current cell with the completely corrected formula displayed in the dialog box 60, and the result of the formula is calculated and displayed in cell A5, as shown in FIG. 3F.

Figure 4:
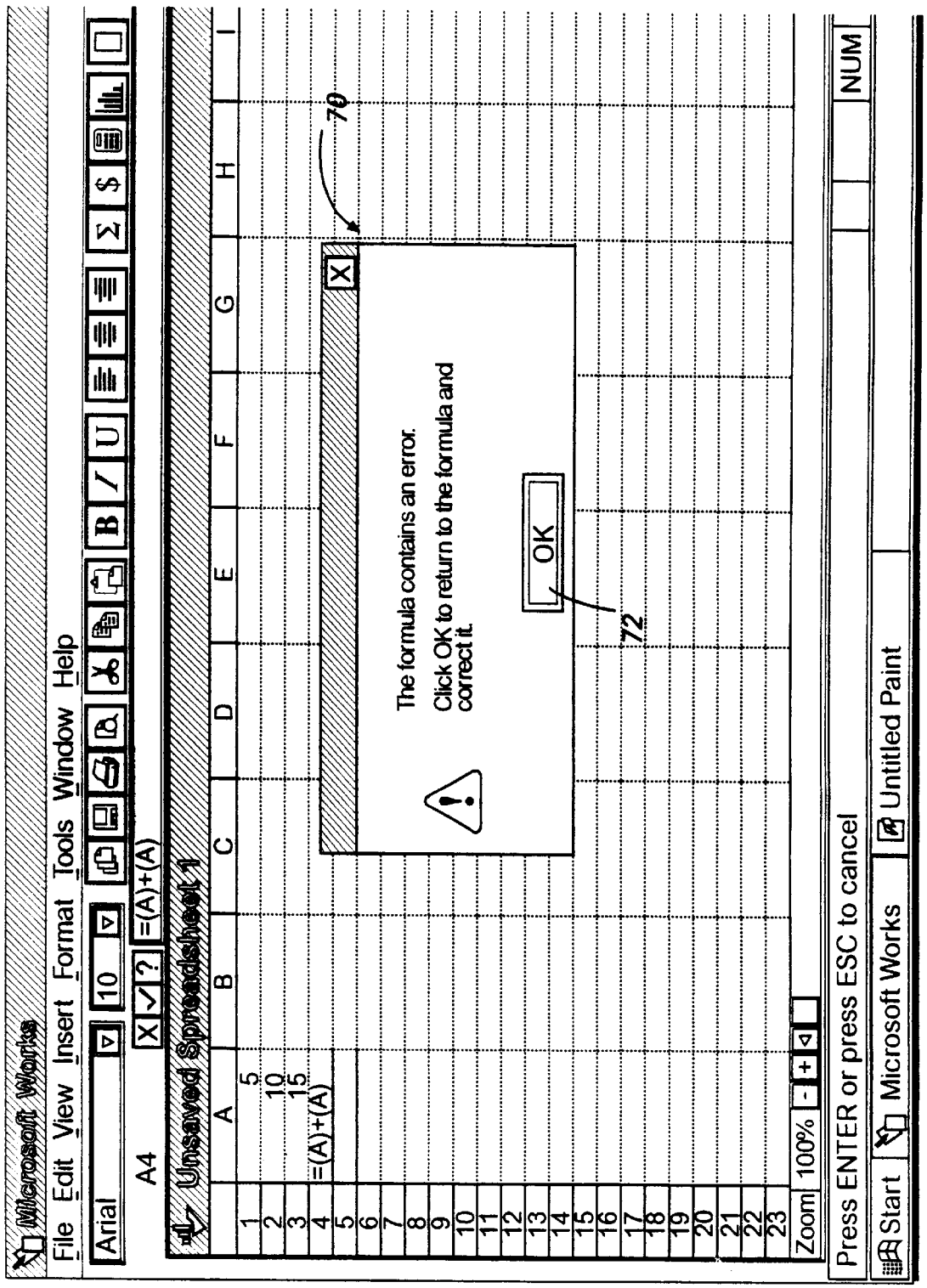
FIG. 4 is an example of a display screen displayed in accordance with the present invention when none of the errors in the formula is correctable.

Alternatively, another dialog box may be displayed when the present invention detects an error in a formula but cannot determine where the error is located or what a suggested correction should be. This is shown in FIG. 4, where the user has entered the formula (A)+(A) in cell A4. The correct formula should be A1+A2. The present invention examines the formula and determines that the formula is incorrectly entered because there are no numbers or valid cell references in the formula. In this case, the present invention displays a "give up" dialog box 70 that informs the user that the formula contains an error and allows the user to select the OK button 72 to return to the formula to manually edit it.

When a formula is constructed, a token is created for each character that is entered in the function. The tokens are arranged in a formula token stack. When the user enters the first character in the formula, a token is created corresponding to the first character and is placed on the bottom of the formula token stack. For each subsequent character that is entered, a corresponding token is created and is placed on top of the formula token stack. Thus, the token corresponding to the first character entered in the formula is on the bottom of the formula token stack, and the token corresponding to the last character in the formula is on top of the stack. If a character in the middle of the formula is subsequently replaced by another character, the token for the replacement character is inserted into the formula token stack in place of the token for the replaced character.

After the user has completed constructing the formula and the formula token stack has been created, the user enters the formula in the current cell by selecting the check box. When the check box is selected, the present invention causes the formula token stack to be parsed. The present invention utilizes a standard spreadsheet parser that uses standard parsing techniques well known to those skilled in the art.

The parser examines each token in the formula token stack beginning with the first token, i.e., the token on the bottom of the stack. The present invention includes a list of proper combinations of tokens for a formula. Therefore, the parser can determine whether the formula contains a syntax error or a cell reference error. For example, when the parser detects a token representing an operator that follows a previous token representing an operator, the method of the present invention determines that multiple operators are located adjacent to one another. Such a combination of operators is a syntax error in the formula.

Many other syntax errors exist. The present invention parses the formula token stack to locate the syntax and cell reference errors described below in Table 1.

TABLE 1

Types of Formula Errors

Unmatched parentheses
Brackets used as parentheses,
Extra operators in the beginning
Trailing operator without operand
Implied multiplication
Extra decimal point
"X" used as multiplication operator
Multiple operators
Comma as separator
Misplaced colon in range
Transposed cell reference
Extra space in cell reference
Extra space between numbers
Using semicolon instead of colon in range
Extra space between function name and parentheses
Commas at end of formula When the present invention detects an error in the formula, the present invention assigns an error class code to the error. For example, each type of error listed in Table 1 has a unique error class code associated therewith. Therefore, the present invention not only detects the presence of an error in a formula, but also identifies the type of error that exists.

For each error class code, the present invention includes an error corrector rule. Each error corrector rule includes a method that determines whether a correction can be identified. For example, the formula shown in the spreadsheet of FIGS. 3A–F includes a cell reference that should be entered as "A22", but is incorrectly entered as "2A2". A token is created for each character and is placed on the formula token stack. The parser parses the formula token stack, and the method of the present invention compares the combination of tokens to a list of acceptable combinations to determine that the character sequence "2A2" is an error. From the combination of tokens, the invention determines that the error is a transposed cell reference.

An error class code corresponding to the type of error, i.e., a transposed cell reference, is generated. The error corrector rule associated with the error class code is then applied to the error. The error corrector rule examines the tokens associated with the error to identify and suggest a correction to the error. For example, the error corrector rule for transposed cell references rearranges the characters of the incorrect cell reference to make the valid cell reference "A22". Therefore, the present invention replaces the error "2A2" with the suggested correction "A22".

In a similar manner, other appropriate error corrector rules are applied to each type of error identified in the formula. A summary of the corrective measures applied by each error corrector rule is provided in Table 2.

TABLE 2

Results Obtained from Application of Error Corrector Rules

| Error: | Unmatched parentheses |
|---|---|
| Correction: | Add closing/opening parentheses for unmatched opening/closing parentheses. For multiple open parentheses, add closing parentheses at the end of the formula. For unmatched closing parentheses, delete closing parentheses. |
| Error: | Brackets used as parentheses |
| Correction: | Replace opening/closing brackets with opening/closing parentheses. |
| Error: | Extra operators in the beginning |
| Correction: | Delete extra operators at the beginning of the formula. |
| Error: | Trailing operator without operand |
| Correction: | Delete trailing operators without operands. |
| Error: | Implied multiplication |
| Correction: | Add multiplication operator when a number/cell reference is followed by a parentheses. Add multiplication operator when a closed parentheses is followed by a number/cell reference. |
| Error: | Extra decimal point |
| Correction: | Remove extra decimal points within a number starting from the right side of the number until the number is valid. |
| Error: | "X" used as multiplication operator |
| Correction: | Replace character "X" with multiplication operator "*". |
| Error: | Multiple operators |
| Correction: | Delete multiple operators concatenated together from right to left. |
| Error: | Comma as separator |
| Correction: | Delete comma used as a separator in a number. |
| Error: | Misplaced colon in range |
| Correction: | Delete misplaced colon in a range of cell references. |
| Error: | Transposed cell reference |
| Correction: | Reverse characters in transposed cell address. |
| Error: | Extra space in cell reference |
| Correction: | Delete spaces between cell references. |
| Error: | Extra space between numbers |
| Correction: | Delete spaces between numbers. |
| Error: | Using semicolon instead of colon in range |
| Correction: | Replace semicolon in range with colon. |
| Error: | Extra space between function name and parentheses |
| Correction: | Delete space between function name and parentheses. |
| Error: | Comma at end of formula |
| Correction: | Delete comma at the end of formula. |

Figure 5:
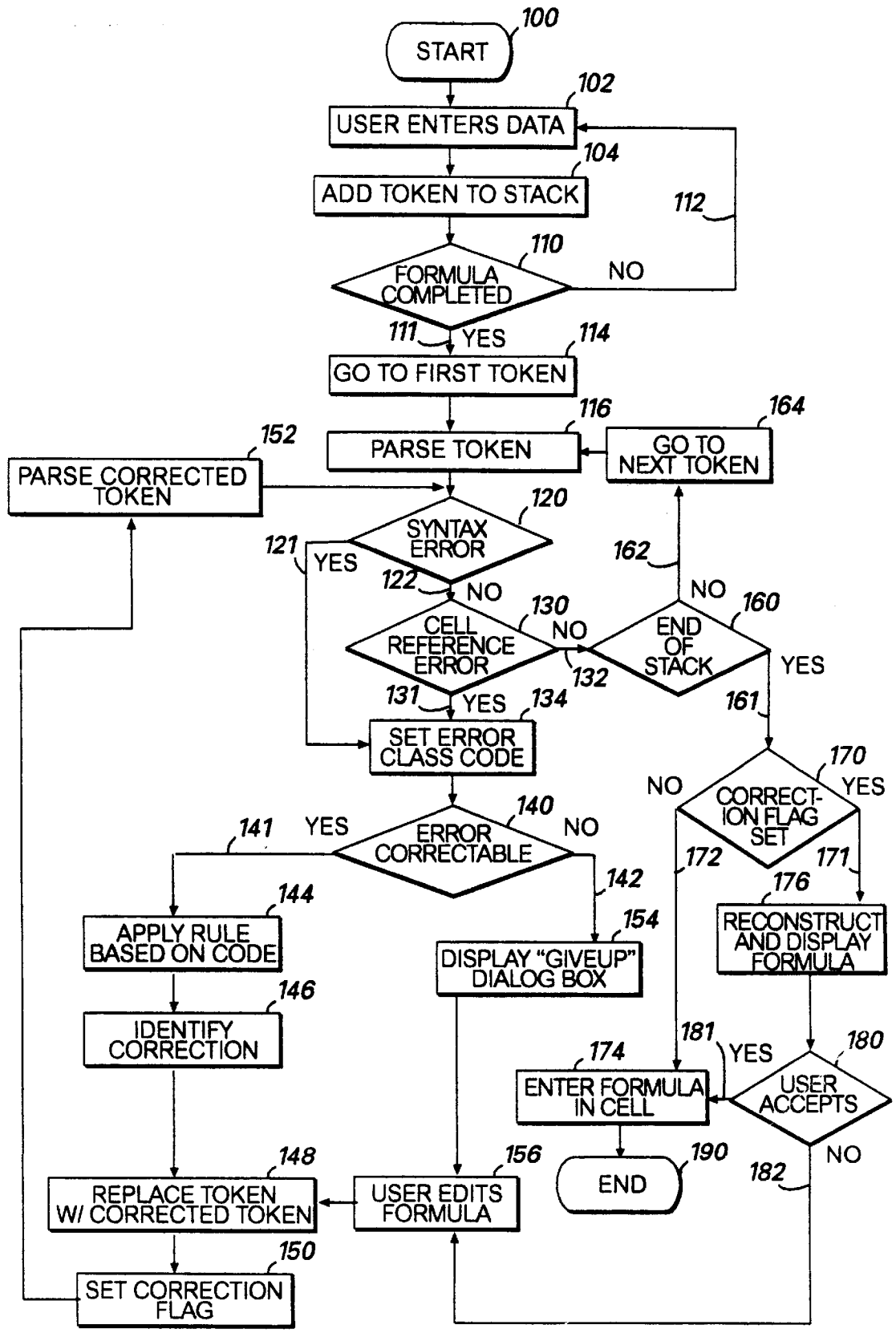
FIG. 5 is a flow chart showing the method of detecting and correcting errors in a formula in a spreadsheet.

The method of detecting and correcting errors in a spreadsheet formula, as described above, is also described with reference to the flow chart of FIG. 5. The method begins at 100. At step 102, the user enters data including a number, cell reference, or function into the formula. At step 104, a token corresponding to the character is created and is added to the top of the formula token stack. At step 110, it is determined whether the formula has been completed. As described above, this is determined when the user selects the check button on the display screen, or any other method provided by the spreadsheet application program. If the formula has not been completed, the method follows "no" branch 112 and returns to step 102, where the user enters more data to the formula. If the formula has been completed, the method follows "yes" branch 111 to step 114.

At step 114, the first token, i.e., the token on the bottom of the formula token stack is selected. At step 116, the token is parsed using standard spreadsheet parsing techniques. At step 120, the method of the present invention determines whether a syntax error exists in the formula. If a syntax error exists, the method follows "yes" branch 121 to step 134. If no syntax error exists in the formula, the method follows "no" branch 122 and proceeds to step 130.

At step 130, it is determined whether a cell reference error exists in the formula. If no cell reference error exists, the method follows "no" branch 132 to step 160. At step 160, it is determined whether the parsed token was the last token in the formula token stack. If the end of the formula token stack has not been reached, the method follows "no" branch 162 to step 164. At step 164, the next token is selected, and the method returns to step 116 for parsing the token. If all of the tokens in the formula token stack have been parsed, as determined at step 160, the method follows "yes" branch 161 to step 170.

When either a syntax error or a cell reference error has been detected at steps 120 and 130, respectively, an error class code is set at step 134. Each error class code is associated with a predetermined type of error. There is one error class code associated with each type of error.

The method then proceeds to step 140 where it is determined whether the detected error is correctable. The error is deemed to be correctable if there exists an error corrector rule associated with the error class code. If an error corrector rule exists for the assigned error class code, the error is correctable, and the method follows "yes" branch 141 to step 144. At step 144, the appropriate error corrector rule is applied to the error in the formula. A correction is identified at step 146 and, at step 148, the token corresponding to the correction is inserted into the formula token stack in place of the token corresponding to the error. A correction flag is set at step 150. The corrected token is parsed at step 152, and the method then returns to step 120.

If it is determined at step 140 that the error is not correctable, the method follows "no" branch 142 and proceeds to step 154 where a "give up" dialog box is displayed. The user then manually edits the formula at step 156, and the method then proceeds to step 148.

After the entire formula token stack has been parsed, as determined at step 160, the method determines, at step 170, whether a correction flag has been set. If a correction flag has not been set, meaning that the formula contains no corrections, the method follows "no" branch 172 to step 174. At step 174, the formula is entered in the cell. The method then terminates at 190.

If it is determined at step 170 that a correction flag has been set, the method follows "yes" branch 171 to step 176. At step 176, the corrected formula is displayed to the user in a dialog box. At step 180, it is determined whether the user accepts the corrected formula. If not, the method follows "no" branch 182 to step 156. If the user accepts the corrected formula, the method follows "yes" branch 181 to step 174 where the formula is entered in the cell.

In summary, the present invention provides a method and system that detects and corrects a formula entered in a cell of a spreadsheet. A token is created corresponding to each entry in the formula. As the formula is constructed, each token is added to the top of a formula token stack. When the formula is completed, a parser parses the formula token stack starting at the bottom of the stack and parsing each subsequent token. By examining the tokens in the formula token stack and their relationship to other tokens, the present invention determines whether an error exists in the formula. If an error is found to exist in the formula, an error class code is assigned to the error corresponding to the type of error. An error corrector rule corresponding to the error class code is applied and identifies a correction for the error. After a correction for the error is identified, the remainder of the formula token stack is parsed to detect and correct any other errors. When the entire formula token stack has been parsed and all detected errors have been corrected, a dialog box is displayed containing the completely corrected formula.

From the foregoing, it will be appreciated that the preferred embodiment of the present invention overcomes the drawbacks of the prior art described hereinabove. From the description of the preferred embodiment, equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. In association with a computer system, a method for detecting and correcting an error in a formula in a cell of a spreadsheet, comprising the steps of:

creating a token for each character entered in the formula;

adding each token to a formula token stack;

for each token in the formula token stack, parsing the token to determine whether an error exists in the formula; and if an error exists in the formula that is one of a predetermined type of error:

assigning an error class code based on the type of error; and applying an error corrector rule to identify a correction to the error.

2. The method of claim 1 further comprising displaying the corrected formula in a dialog box that allows the user to either accept the corrected formula for entry into the cell or manually edit the incorrect formula.

3. The method of claim 1 wherein the error class code is one of a plurality of error class codes and each error class code is associated with a predetermined type of error.

4. The method of claim 3 wherein the error class code is assigned only for an error that is of a predetermined type.

5. The method of claim 1 wherein the error corrector rule is one of a plurality of error corrector rules and each error corrector rule is associated with a predetermined error class code.

6. The method of claim 1 further comprising displaying a dialog box prompting the user to manually edit the formula if the error is not one of a predetermined type.

7. The method of claim 1 further comprising displaying a dialog box prompting the user to manually edit the formula if the error corrector rule cannot identify a correction.

8. The method of claim 7 wherein the error in the formula displayed in the cell is highlighted.

9. A computer system, including a program module that displays cells of a spreadsheet on a display, for detecting and correcting an error in a formula in a cell of said spreadsheet, comprising:

means for creating a token for each character entered in the formula;

means for adding each token to a formula token stack;

means for parsing each token in the formula token stack to determine whether an error exists in the formula;

means for storing a list of predetermined types of errors; and means for assigning an error class code based on the type of error, if the error is one of said predetermined types; and means for applying an error corrector rule to identify a correction to the error.

10. The system of claim 9 further comprising means for displaying the corrected formula in a dialog box that allows the user to either accept the corrected formula for entry into the cell or manually edit the incorrect formula.

11. The system of claim 9 wherein each error class code is associated with a predetermined type of error.

12. The system of claim 11 wherein the error class code is assigned only for an error that is of a predetermined type.

13. The system of claim 9 wherein the error corrector rule is one of a stored list of error corrector rules and each error corrector rule is associated with a predetermined error class code.

14. The system of claim 9 further comprising displaying a dialog box prompting the user to manually edit the formula if the error is not one of a predetermined type.

15. The system of claim 9 further comprising displaying a dialog box prompting the user to manually edit the formula if the error corrector rule cannot identify a correction.

16. The system of claim 15 wherein the error in the formula displayed in the cell is highlighted.

17. A computer-readable medium having computer-executable instructions for detecting and correcting an error in a formula in a cell of a spreadsheet by performing steps comprising:

creating a token for each character entered in the formula;

adding each token to a formula token stack;

for each token in the formula token stack, parsing the token to determine whether an error exists in the formula; and if an error exists in the formula that is one of a predetermined type of error:

assigning an error class code based on the type of error; and applying an error corrector rule to identify a correction to the error.

18. The computer-readable medium of claim 17 having further computer-executable instructions for performing the step of displaying the corrected formula in a dialog box that allows the user to either accept the corrected formula for entry into the cell or manually edit the incorrect formula.

19. The computer-readable medium of claim 17 wherein the error class code is one of a plurality of error class codes and each error class code is associated with a predetermined type of error.

20. The computer-readable medium of claim 19 wherein the error class code is assigned only for an error that is of a predetermined type.

21. The computer-readable medium of claim 17 wherein the error corrector rule is one of a plurality of error corrector rules and each error corrector rule is associated with a predetermined error class code.

22. The computer-readable medium of claim 17 having further computer-executable instructions for performing the step of displaying a dialog box prompting the user to manually edit the formula if the error is not one of a predetermined type.

23. The computer-readable medium of claim 17 having further computer-executable instructions for performing the step of displaying a dialog box prompting the user to manually edit the formula if the error corrector rule cannot identify a correction.

24. The computer-readable medium of claim 23 wherein the error in the formula displayed in the cell is highlighted.

* * * * *